United States Patent
Chang et al.

(10) Patent No.: US 10,212,412 B2
(45) Date of Patent: Feb. 19, 2019

(54) METHOD OF INCREASING PHOTOGRAPHING SPEED OF PHOTOGRAPHING DEVICE

(71) Applicant: ELECTRONICS AND TELECOMMUNICATIONS RESEARCH INSTITUTE, Daejeon (KR)

(72) Inventors: Ju Yong Chang, Daejeon (KR); Jin Seo Kim, Daejeon (KR); Hee Kwon Kim, Daejeon (KR); Soon Chan Park, Daejeon (KR); Ji Young Park, Daejeon (KR); Kwang Hyun Shim, Daejeon (KR); Moon Wook Ryu, Seoul (KR); Ho Wook Jang, Daejeon (KR); Hyuk Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 255 days.

(21) Appl. No.: 15/064,668

(22) Filed: Mar. 9, 2016

(65) Prior Publication Data
US 2016/0286200 A1 Sep. 29, 2016

(30) Foreign Application Priority Data
Mar. 25, 2015 (KR) ........................ 10-2015-0041711

(51) Int. Cl.
| | |
|---|---|
| H04N 5/14 | (2006.01) |
| H04N 13/111 | (2018.01) |
| H04N 13/257 | (2018.01) |
| H04N 13/271 | (2018.01) |
| H04N 13/00 | (2018.01) |

(52) U.S. Cl.
CPC ......... *H04N 13/271* (2018.05); *H04N 13/111* (2018.05); *H04N 13/257* (2018.05); *H04N 5/145* (2013.01); *H04N 2013/0085* (2013.01)

(58) Field of Classification Search
None
See application file for complete search history.

(56) References Cited

U.S. PATENT DOCUMENTS

| | | | |
|---|---|---|---|
| 5,978,041 | A | 11/1999 | Masuda et al. |
| 6,791,623 | B1 | 9/2004 | Masuda et al. |

(Continued)

FOREIGN PATENT DOCUMENTS

| | | |
|---|---|---|
| KR | 10-0233900 B1 | 1/2000 |
| KR | 10-1502365 B1 | 3/2015 |

*Primary Examiner* — Kaitlin A Retallick
(74) *Attorney, Agent, or Firm* — LRK Patent Law Firm

(57) ABSTRACT

A method of increasing a photographing speed of a photographing device which capture an image through a combination of two or more photographing devices and generate and provide an image by using the captured image, thereby increasing a photographing speed. An RGB image obtaining device and a depth image obtaining device alternately perform photographing to obtain an image. Also, a second depth image and a second RGB image respectively corresponding to a first RGB image and a first depth image which are alternately obtained by performing alternate photographing are synthesized and output, thereby actually increasing a photographing speed by twice.

11 Claims, 5 Drawing Sheets

(56) References Cited

U.S. PATENT DOCUMENTS

| | | |
|---|---|---|
| 7,239,718 B2 | 7/2007 | Park et al. |
| 8,659,594 B2 | 2/2014 | Kim et al. |
| 9,947,064 B2 * | 4/2018 | Jeong .................. G06T 7/50 |
| 2009/0278965 A1 | 11/2009 | Ko |
| 2010/0110070 A1 | 5/2010 | Kim et al. |
| 2011/0286661 A1 * | 11/2011 | Lee .................. G06T 3/4007 |
| | | 382/154 |
| 2011/0317005 A1 * | 12/2011 | Atkinson ............. G01S 17/023 |
| | | 348/135 |
| 2013/0107005 A1 * | 5/2013 | Lim .................. H04N 5/33 |
| | | 348/46 |
| 2016/0296795 A1 * | 3/2016 | Chang et al. ...... A63B 24/0006 |
| | | 382/103 |
| 2016/0309084 A1 * | 10/2016 | Venkataraman et al. .................... |
| | | H04N 5/23232 |
| | | 348/218.1 |

* cited by examiner

METHOD OF INCREASING PHOTOGRAPHING SPEED OF PHOTOGRAPHING DEVICE

CROSS-REFERENCE TO RELATED APPLICATIONS

This application claims priority under 35 U.S.C. § 119 to Korean Patent Application No 10-2015-0041711, filed on Mar. 25, 2015, the disclosure of which is incorporated herein by reference in its entirety.

TECHNICAL FIELD

The present invention relates to a method of increasing a photographing speed of a photographing device obtaining image information and a photographing device whose a photographing speed has been increased based on the method, and more particularly, to a photographing device with increased photographing speed and a method, which capture an image through a combination of two or more photographing devices and generate and provide an image by using the captured image, thereby increasing a photographing speed.

BACKGROUND

In devices such as cameras, camcorders, and the like for obtaining image information, a photographing speed is one of very important factors for determining the scope of use of a photographing device.

For example, in a case of photographing a very fast motion like a golf swing motion, if a photographing speed of a photographing device is not sufficiently high, a detailed motion of the user cannot be sufficiently added into a captured image, and for this reason, unsatisfactory information is obtained.

In the related art, a high-priced photographing device having a sufficiently high photographing speed is generally used for obtaining satisfactory information when photographing a fast motion. However, a high-priced photographing device causes an economic problem, and in a case of using a general photographing device for some reason such as economy, a satisfactory result is not obtained.

Therefore, in the related art, by using a high-priced photographing device, a fast motion is photographed, and satisfactory information is obtained. However, in terms of economy, it is required to develop technology for increasing a photographing speed by using a general photographing device instead of a high-priced photographing device, and moreover, availability of the high-priced photographing device is not high.

SUMMARY

Accordingly, the present invention provides a photographing device and a method of increasing a photographing speed, which alternately obtain images by using a photographing device obtaining a red, green, and blue (RGB) image and a device capturing a depth image and generate and provide an image corresponding to an interval between times when the images are respectively obtained, based on the obtained images, thereby increasing a photographing speed.

In one general aspect, a method of increasing a photographing speed of a photographing device includes: obtaining a first depth image at a t−1st time; obtaining a first RGB image at a tth time; obtaining a second depth image at the t−1st time; generating a depth image at the tth image by using the first depth image and the first RGB image; generating a RGB image at the t+1st image by using the first RGB image and the second depth image; and outputting the depth image corresponding to the tth time and the first RGB image as an output image corresponding to the tth time, and outputting the RGB image corresponding to the t+1st time and the second depth image as an output image corresponding to the t+1st time.

In another general aspect, a method of increasing a photographing speed of a photographing device includes: obtaining a first depth image at a t−1st time; obtaining a first RGB image at a tth time; projecting the first depth image onto an RGB camera point to generate a second depth image at the t−1st time; estimating a motion vector between the second depth image and the first RGB image; rendering a third depth image corresponding to the tth time from the second depth image by using the estimated motion vector; projecting the third depth image onto a depth camera point to generate a fourth depth image at the tth time; and outputting the first RGB image and the fourth depth image as an output image corresponding to the tth time.

The generating of the second depth image may include: calculating three-dimensional (3D) coordinates corresponding to each of pixels of the first depth image by using an internal parameter of a depth camera; and projecting the calculated 3D coordinates onto an image plane of an RGB camera by using an external parameter between the RGB camera and the depth camera.

The estimating of the motion vector may include: matching pixels of the first RGB image with pixels included in a search region of the second depth image to calculate the motion vector.

In another general aspect, a method of increasing a photographing speed of a photographing device includes: obtaining a first RGB image at a t−1st time; obtaining a first depth image at a tth time; projecting the first depth image onto an RGB camera point to generate a second depth image at the tth time; estimating a motion vector between the first RGB image and the second depth image; rendering a second RGB image corresponding to the tth time from the first RGB image by using the estimated motion vector; and outputting the first depth image and the second RGB image as an output image corresponding to the tth time.

The generating of the second depth image may include: calculating three-dimensional (3D) coordinates corresponding to each of pixels of the first depth image by using an internal parameter of a depth camera; and projecting the calculated 3D coordinates onto an image plane of an RGB camera by using an external parameter between the RGB camera and the depth camera.

The estimating of the motion vector may include: matching pixels of the first RGB image with pixels included in a search region of the second depth image to calculate the motion vector.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

In a detailed description of an embodiment of the present invention, it is assumed that two or more photographing devices alternately obtain images. According to an embodiment of the present invention, a device obtaining a depth image and a device obtaining an RGB image alternately obtain images.

Figure 1:
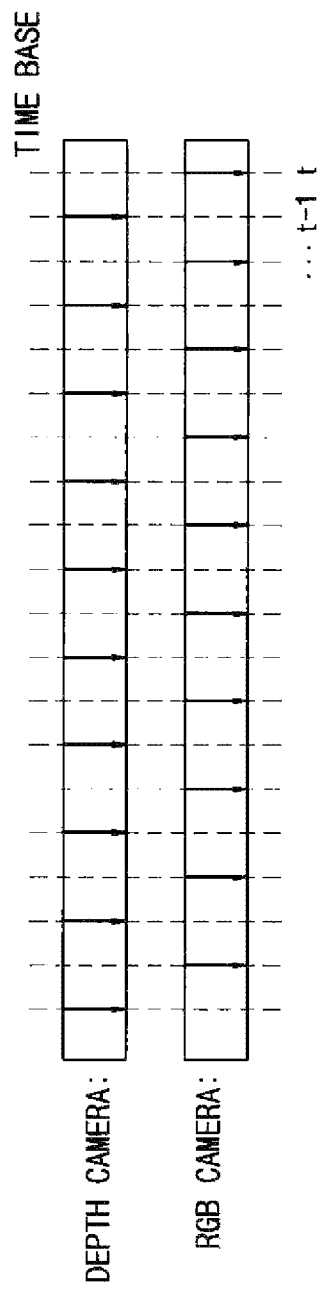
FIG. 1 is a diagram illustrating times when a photographing device according to an embodiment of the present invention respectively obtains a depth image and an RGB image.

FIG. 1 is a diagram illustrating times when a photographing device according to an embodiment of the present invention respectively obtains a depth image and an RGB image. As shown in FIG. 1, a depth camera may obtain a depth image at a t−1st time, and an RGB camera may obtain an RGB image at a t time. For example, if the RGB image is obtained at the t−1 st time, the depth image may be obtained at the t time.

That is, the present invention provides a method and a photographing device, which generate an image, corresponding to a time when an image is not obtained, from images which are respectively two kinds of cameras which alternately capture images, thereby increasing a photographing speed by twice.

Hereinafter, a method of increasing a photographing speed of a photographing device according to an embodiment of the present invention will be described with reference to FIGS. 2 to 4. In the following description, unless a separate description is made, the method is assumed as being performed by a photographing device.

Figure 2:
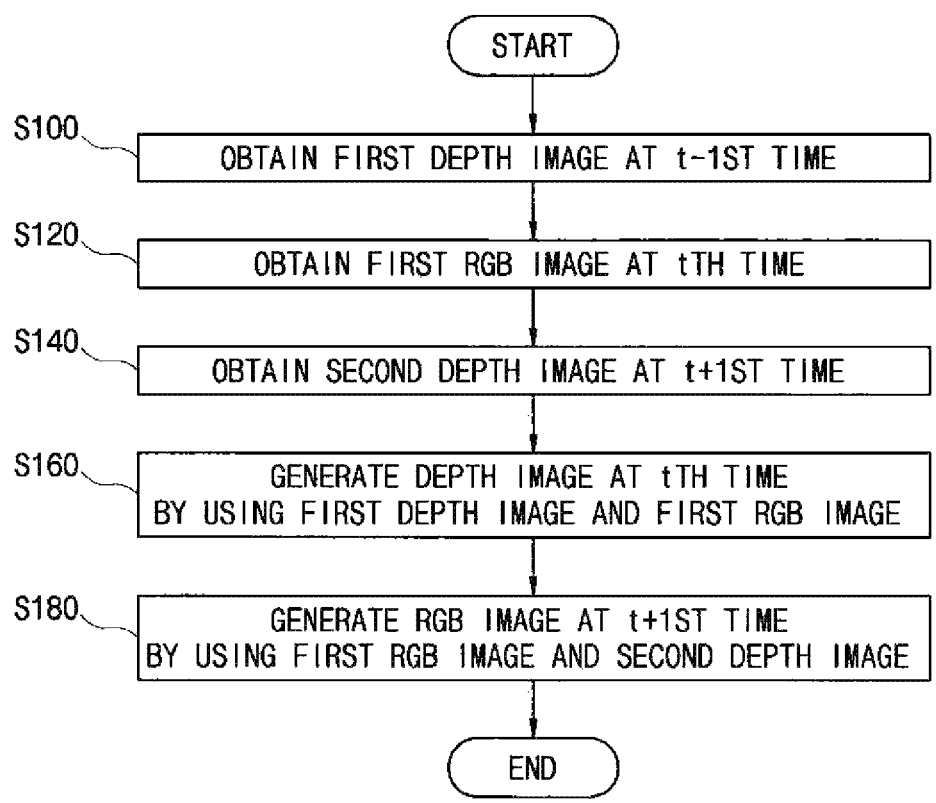
FIG. 2 is a flowchart illustrating a whole process of a method of increasing a photographing speed of a photographing device according to an embodiment of the present invention.

FIG. 2 is a flowchart illustrating a whole process of a method of increasing a photographing speed of a photographing device according to an embodiment of the present invention. FIG. 3 is a flowchart illustrating a method of generating a depth image at a time when the depth image is not obtained in a process of a method of increasing a photographing speed of a photographing device according to an embodiment of the present invention. FIG. 4 is a flowchart illustrating a method of generating an RGB image at a time when the RGB image is not obtained in a process of a method of increasing a photographing speed of a photographing device according to an embodiment of the present invention.

Operations of a method of increasing a photographing speed of a photographing device including a depth camera and an RGB camera will be described with reference to FIG. 2.

In step S100, the depth camera of the photographing device may obtain a first depth image at a t−1st time. Also, the RGB camera may obtain a first RGB image at a tth time in step S120, and the depth camera may obtain a second depth image at a t+1st time in step S140.

In step S160, the photographing device may generate a depth image at the tth time, based on the first depth image obtained at the t−1st time and the first RGB image obtained at the tth time. In step S180, the photographing device may generate an RGB image at the t+1st time, based on the first RGB image obtained at the tth time and the second depth image obtained at the t+1st time. Here, a method of generating a depth image by using an RGB image and a method of generating an RGB image by using a depth image will be described below in detail.

As a result of step S160, the first RGB image obtained by the RGB camera and the depth image generated from the first depth image and the first RGB image may be simultaneously output at the tth time. As a result of step S180, the second depth image obtained by the depth camera and the RGB image generated from the first RGB image and the second depth image may be simultaneously output at the t+1st time.

That is, since a depth image and an RGB image are alternately obtained, a depth image or an RGB image which is not obtained at a corresponding time may be synthesized with an image corresponding to a previous time by using another image obtained at the same time, and an image obtained through the synthesis may be provided, thereby increasing a photographing speed of the photographing device by twice.

Hereinafter, an operation of generating a depth image at a time when a depth image is not obtained in a method of increasing a photographing speed of a photographing device according to an embodiment of the present invention will be described with reference to FIG. 3.

In step S200, a depth camera of the photographing device according to an embodiment of the present invention may obtain a first depth image at a t−1st time. In step S210, an RGB camera may obtain a first RGB image at a tth time.

In step S220, the photographing device may project the first depth image onto an RGB camera point to generate a second depth image.

In detail, a method of calculating three-dimensional (3D) coordinates corresponding to each of pixels of the first depth image by using an internal parameter of the depth camera may be used. In this case, the photographing device may project the calculated 3D coordinates onto an image plane of the RGB camera by using an external parameter between the RGB camera and the depth camera.

In step S230, the photographing device may estimate a motion vector between the first RGB image and the second depth image which is generated by projecting the first depth image onto the RGB camera point.

By matching pixels of the first RGB image with pixels included in a search region of the depth image, the motion vector may be calculated as expressed in the following Equation (1):

$$I(X;Y) \triangleq D_{KL}(p(x,y)) \| p(x)p(y) = \sum_{y \in Y} \sum_{x \in X} p(x,y) \log\left(\frac{p(x,y)}{p(x)p(y)}\right) \quad (1)$$

where X denotes a (tetragonal) patch in the first RGB image, and Y denotes a (tetragonal) patch in the second depth image. Also, x denotes an intensity value or a (r, g, b) color vector corresponding to one pixel in the patch "X", and y denotes a depth value corresponding to one pixel in the patch "Y". Hereinafter, for convenience of description, it is assumed that x denotes an intensity value.

Furthermore, p(x) may be a probability distribution function which is generated from intensity values of all pixels in the patch "X". For example, in p(x), when nine pixels are disposed in the tetragonal patch "X" and intensity values of the nine pixels are 0, 0, 110, 110, 125, 255, 255, 255, and 255, p(0) may be 2/9 (p(0)=2/9), p(110) may be 2/9 (p(110)=2/9), p(125) may be 1/9 (p(125)=1/9), and p(255) may be 4/9 (p(255)=4/9), and in the other x (0<=x<=255), p(x) may be 0 (p(x)=0).

Similarly, p(y) may be a probability distribution function which is defined based on the patch "Y" in the depth image. Also, p(x, y) may be a probability distribution function which is generated from (x, y) of corresponding pixels of two the tetragonal patches "X" and "Y" in the above-described way.

An amount defined as expressed in Equation (2) may be referred to as mutual information between two probability variables "x" and "y" and may denote a similarity between the two patches "X" and "Y" having different modalities.

Through such an operation, the photographing device may estimate the motion vector between the first RGB image and the second depth image.

In step S240, the photographing device may render a third depth image corresponding to the tth time from the second depth image by using the motion vector estimated through Equation (1).

That is, the photographing device may perform rendering to generate an image corresponding to the tth time by using an image corresponding to the t–1st time and motion information, and the image may be generated through the following Equation (2):

$$I_t(p) = I_{t-1}(p + m(x)) \quad (2)$$

where p denotes pixel coordinates, and m(p) denotes a motion vector of a pixel "p".

Since the generated third depth image is an image projected onto an image plane of the RGB camera, the photographing device may re-project the third depth image onto an image plane of the depth camera to generate a fourth depth image at the tth time in step S250.

Moreover, the photographing device may output, as an output image corresponding to the tth time, the first RGB image which is obtained through the RGB camera at the tth time and the fourth depth image which is generated at the tth time.

Therefore, a depth image may be generated and output even at a time when an image is not obtained by the depth camera, thereby providing an image corresponding to a photographing speed which has increased by twice.

Hereinafter, an operation of generating and outputting an RGB image at a time when an RGB image is not obtained in a method of increasing a photographing speed of a photographing device according to an embodiment of the present invention will be described with reference to FIG. 4.

In step S300, an RGB camera may obtain a first RGB image at a t–1st time. In step S320, a depth camera may obtain a first depth image at a tth time.

In step S340, the photographing device may project the first depth image onto an RGB camera point to generate a second depth image at the tth time.

In step S360, the photographing device may estimate a motion vector between the first RGB image and the generated second depth image. In step S380, the photographing device may render a second RGB image corresponding to the tth time from the first RGB image by using the estimated motion vector.

Figure 3:
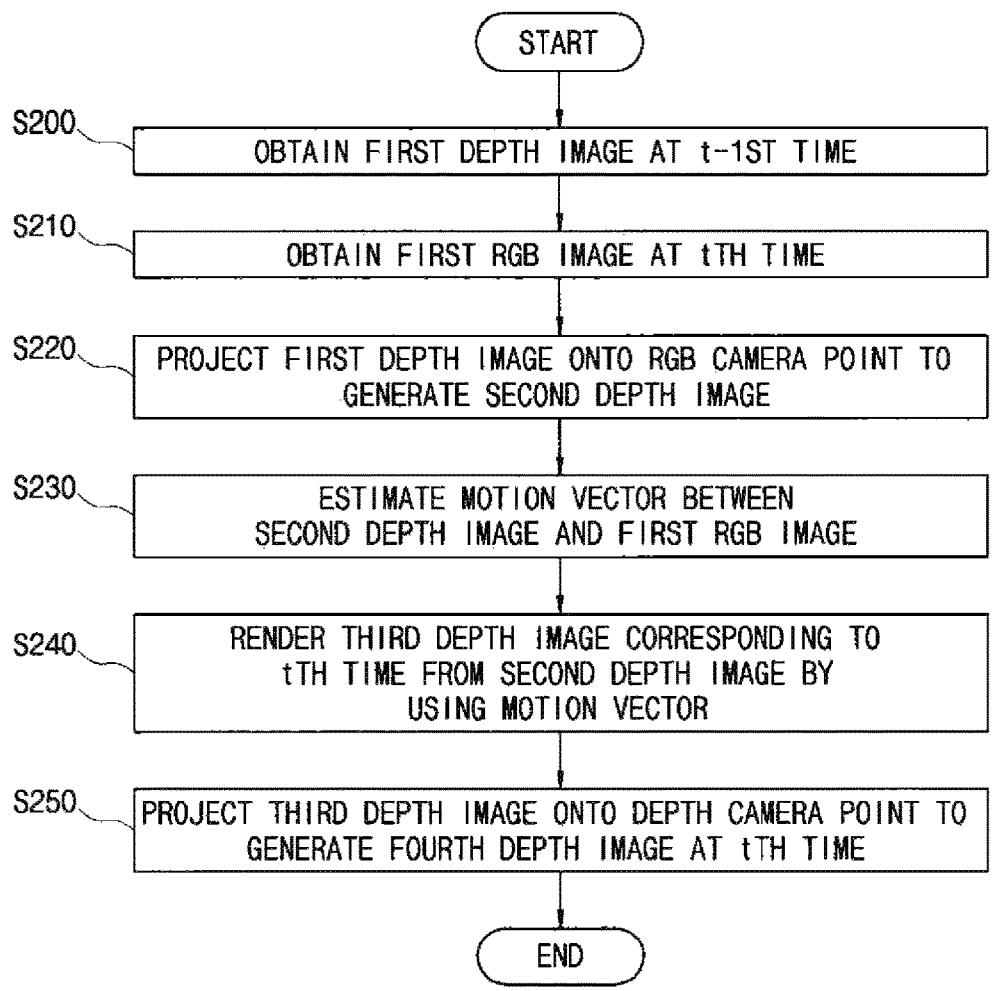
FIG. 3 is a flowchart illustrating a method of generating a depth image at a time when the depth image is not obtained in a process of a method of increasing a photographing speed of a photographing device according to an embodiment of the present invention.
Figure 4:
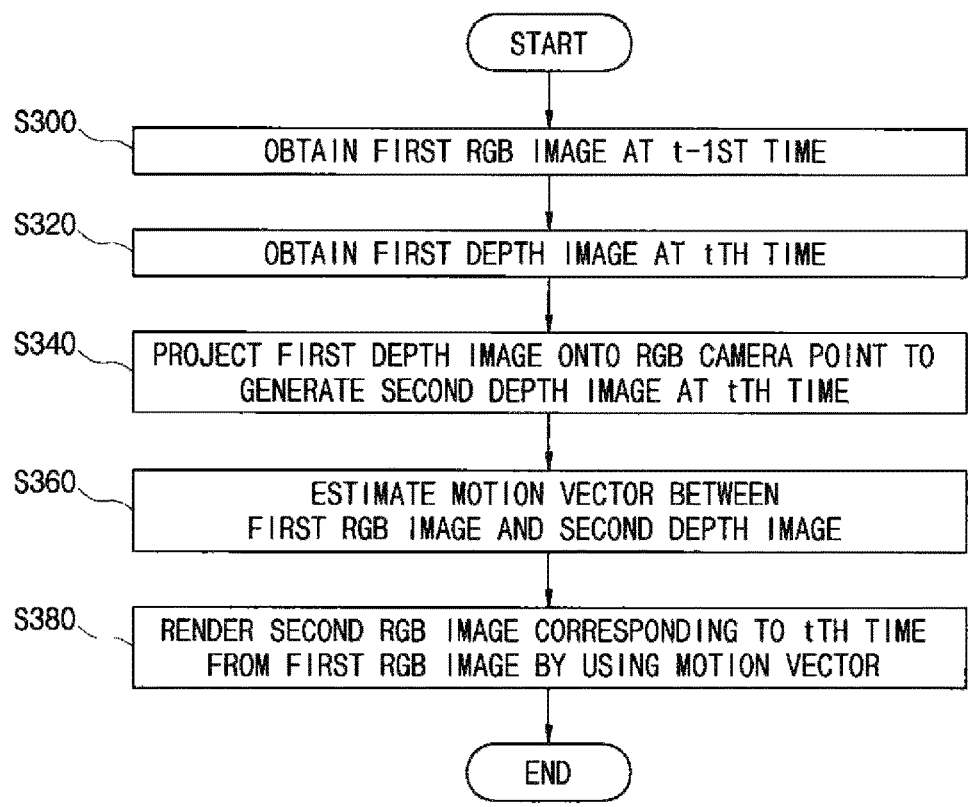
FIG. 4 is a flowchart illustrating a method of generating an RGB image at a time when the RGB image is not obtained in a process of a method of increasing a photographing speed of a photographing device according to an embodiment of the present invention.

A method of projecting a depth image onto the RGB camera point and a method of estimating a motion vector are the same as the descriptions of FIG. 3, and the photographing device may output, as an output image corresponding to the tth time, the first depth image obtained through the depth camera and the second RGB image rendered from the first RGB image.

Therefore, an RGB image may be generated and provided at a time when the RGB image is not obtained, thereby providing an image corresponding to a photographing speed which has increased by twice.

According to the embodiments of the present invention, a photographing speed increases by twice more than that of a related art photographing device outputting an RGB image and a depth image which are synchronized with each other, and thus, twice more images are obtained during the same time interval. Also, since twice more images are obtained during the same time interval, a high-priced photographing device is not used for photographing a fast motion, and thus, the cost spent in purchasing a photographing device is reduced.

Figure 5:
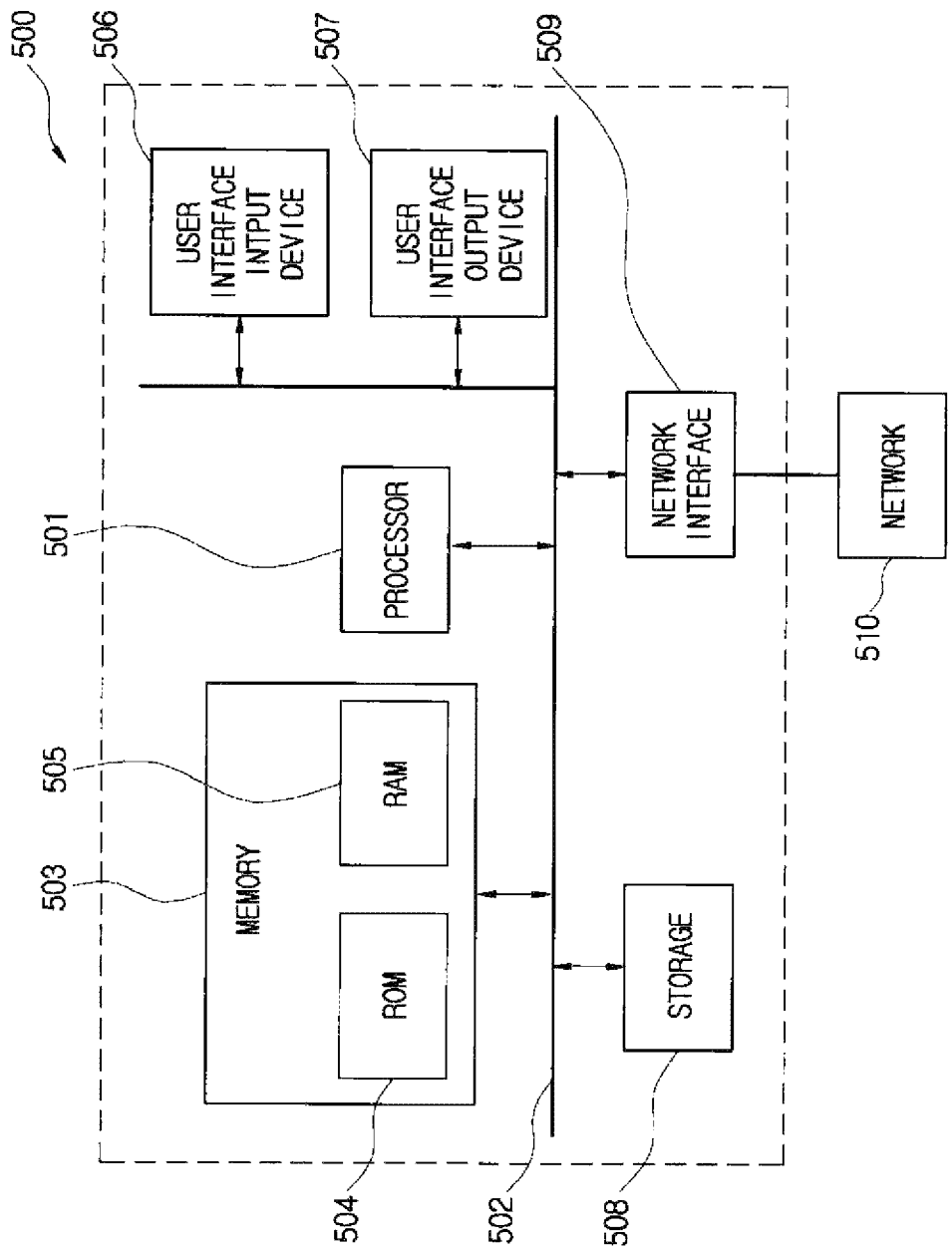
FIG. 5 is a block diagram illustrating a computer system for the present invention.

An embodiment of the present invention may be implemented in a computer system, e.g., as a computer readable medium. As shown in FIG. 5, a computer system 500 may include one or more of a processor 501, a memory 503, a user input device 506, a user output device 507, and a storage 508, each of which communicates through a bus 502. The computer system 500 may also include a network interface 509 that is coupled to a network 510. The processor 501 may be a central processing unit (CPU) or a semiconductor device that executes processing instructions stored in the memory 503 and/or the storage 508. The memory 503 and the storage 508 may include various forms of volatile or non-volatile storage media. For example, the memory may include a read-only memory (ROM) 504 and a random access memory (RAM) 505.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of increasing a photographing speed of a photographing device, the method comprising:
    obtaining a first depth image at $t-1^{th}$ time;
    obtaining a first RGB image at $t^{th}$ time;
    obtaining a second depth image at a $t+1^{th}$ time;
    generating a depth image at the $t^{th}$ time by using the first depth image and the first RGB image; and
    generating an RGB image at the $t+1^{th}$ time by using the first RGB image and the second depth image.

2. The method of claim 1, wherein the generating of the depth image comprises: estimating a motion vector between the first RGB image and a depth image generated by projecting the first depth image onto an RGB camera point, and generating the depth image at the $t^{th}$ time by using the estimated motion vector.

3. The method of claim 2, wherein the generating of the depth image comprises: calculating three-dimensional (3D) coordinates corresponding to each, of pixels of the first depth image by using an internal parameter of a depth camera, and projecting the calculated 3D coordinates onto an image plane of an RGB camera to generate a depth image by using an external parameter between the RGB camera and the depth camera.

4. The method of claim 2, wherein the generating of the depth image comprises: matching pixels of the first RGB image with pixels, included in a search region of a depth image generated by projecting the first depth image onto an RGB camera point, to calculate the motion vector.

5. The method of claim 2, wherein the generating of the depth image comprises: re-projecting the depth image, generated from the estimated motion vector, onto an image plane of a depth camera to generate the depth image at the $t^{th}$ time.

6. The method of claim 1, wherein the generating of the depth image comprises: estimating a motion vector between the first RGB image and a depth image generated by projecting the second depth image onto an RGB camera point, and generating the RGB image at the $t+1^{th}$ time by using the estimated motion vector.

7. The method of claim 6, wherein the generating of the RGB image comprises: calculating three-dimensional (3D) coordinates corresponding to each of pixels of the second depth image by using an internal parameter of a depth camera, and projecting the calculated 3D coordinates onto an image plane of an RGB camera to generate a depth image by using an external parameter between the RGB camera and the depth camera.

8. The method of claim 6, wherein the generating of the RGB image comprises: matching pixels of the first RGB image with pixels, included in a search region of a depth image generated by projecting the second depth image onto an RGB camera point, to calculate the motion vector.

9. The method of claim 1, wherein the generating of the depth image comprises: when it is checked that the first RGB image is obtained at the $t^{th}$ time and a depth image is not obtained at the $t^{th}$ time, generating the depth image at the $t^{th}$ time by using the first depth image and the first RGB image.

10. The method of claim 1, wherein the generating of the RGB image comprises: when it is checked that the second depth image is obtained at the $t+1^{th}$ time and an RGB image is not obtained at the $t+1^{th}$ time, generating the RGB image at the $t+1^{th}$ time by using the first RGB image and the second depth image.

11. The method of claim 1, further comprising: outputting the depth image corresponding to the $t^{th}$ time and the first RGB image as an output image corresponding to the $t^{th}$ time, and outputting the RGB image corresponding to the $t+1^{th}$ time and the second depth image as an output image corresponding to the $t+1^{th}$ time.

* * * * *